United States Patent
Itskovich (10) Patent No.: US 8,278,930 B2
(45) Date of Patent: Oct. 2, 2012

(54) DEEP MWD RESISTIVITY MEASUREMENTS USING EM SHIELDING

(75) Inventor: Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 414 days.

(21) Appl. No.: 12/434,450

(22) Filed: May 1, 2009

(65) Prior Publication Data

US 2010/0109905 A1 May 6, 2010

Related U.S. Application Data

(60) Provisional application No. 61/049,742, filed on May 1, 2008.

(51) Int. Cl.
*G01V 3/18* (2006.01)
*G01V 3/26* (2006.01)

(52) U.S. Cl. .............. 324/338; 324/339; 340/854.4; 340/854.8

(58) Field of Classification Search .......... 340/854.6, 340/854.8, 855.7; 166/254.2, 250.01; 175/40, 175/50; 324/338–339
See application file for complete search history.

(56) References Cited

U.S. PATENT DOCUMENTS

| 5,452,761 | A | 9/1995 | Beard et al. |
| 6,906,521 | B2 | 6/2005 | Tabarovsky |
| 7,027,922 | B2 | 4/2006 | Bespalov et al. |
| 7,046,009 | B2 | 5/2006 | Itskovich |
| 7,138,897 | B2 * | 11/2006 | Minerbo et al. ............... 336/90 |
| 7,150,316 | B2 | 12/2006 | Itskovich |
| 7,167,006 | B2 | 1/2007 | Itskovich |
| 7,239,145 | B2 * | 7/2007 | Homan et al. ............... 324/356 |
| 7,759,943 | B2 * | 7/2010 | Homan et al. ............... 324/355 |
| 2004/0183538 | A1 * | 9/2004 | Hanstein et al. ............ 324/339 |
| 2007/0216416 | A1 | 9/2007 | Itskovich |

* cited by examiner

*Primary Examiner* — Giovanna Wright (74) *Attorney, Agent, or Firm* — Charles Knobloch; Arnold & Knobloch, L.L.P.

(57) ABSTRACT

Structure for deep MWD resistivity measurements suitable for both geo-steering and measurements ahead of the drill bit is disclosed. Alternating current is transmitted through a loop and an induction signal is measured by a two-coil bucking receiving system placed at some distance from the transmitter. To further reduce a parasitic effect of the currents in the pipe, a conductive copper shield wrapping around the pipe is used. The length of the shield is about one and one-half to two times longer than the longest transmitter/receiver spacing of the structure. The transmitter/receiver system is located in the center of the described electromagnetic shield.

22 Claims, 10 Drawing Sheets

Comparison of responses: model with steel pipe vs. model with no pipe
2m & 4m spacing bucked system

DEEP MWD RESISTIVITY MEASUREMENTS USING EM SHIELDING

STATEMENT OF RELATED APPLICATIONS

This application claims the benefit of U.S. Provisional Application No. 61/049,742, filed May 1, 2008.

FIELD OF THE INVENTION

The invention relates to the field of electromagnetic induction well logging. More specifically, the present invention is a method of reducing effects of conductive drill pipes on signals in alternating current electromagnetic measurements for evaluation of earth formations ahead of the drillbit.

BACKGROUND

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard '761 patent includes a transmitter coil and a plurality of receiver coils positioned at axially spaced apart locations along the instrument housing. An alternating current is passed through the transmitter coil. Voltages that are induced in the receiver coils as a result of alternating magnetic fields induced in the earth formations are then measured. The magnitude of certain phase components of the induced receiver voltages are related to the conductivity of the media surrounding the instrument.

Rapidly emerging measurement-while-drilling (MWD) technology introduces a new, deep (3-10 meters) scale for an electromagnetic logging application related to well navigation in thick reservoirs. The major problem associated with the MWD environment is the introduction of a metal drill pipe close to the area being measured. This pipe produces a very strong response and significantly reduces the sensitivity of the measured EM field to the effects of formation resistivities and remote boundaries. Previous solutions for this problem typically comprise creating a large spacing (up to 20 meters) between transmitter and receiver. However, the sensitivity of such a tool to remote boundaries is low.

U.S. Pat. No. 7,150,316 to Itskovich, having the same assignee as the present invention and the contents of which are incorporated herein by reference, teaches an apparatus for use in a borehole in an earth formation and a method of using the apparatus. A tubular portion of the apparatus includes a damping portion for interrupting a flow of eddy currents. A transmitter positioned within the damping portion propagates a first transient electromagnetic signal in the earth formation. A receiver positioned within the damping portion axially separated from the transmitter receives a second transient electromagnetic signal indicative of resistivity properties of the earth formation. A processor determines from the first and second transient electromagnetic signals a resistivity of the earth formation. The damping portion includes at least one cut that may be longitudinal or azimuthal. A non-conductive material may be disposed within the cut. Alternatively, the damping portion may include segments having cuts and segments having a non-conducting material on an outer surface thereof.

It has been found that the device of Itskovich provides the ability to determine a distance to an interface in the earth formation in which the borehole is inclined at angles of less than 45 degrees to the interface. The term "interface" is intended to include a boundary between two fluids in an earth formation and also a boundary between different layers of the earth formation. At larger inclinations, the resistivity sensor may be considered to be "looking ahead of the drill" and the ability to identify interfaces 10 m ahead of the bottomhole assembly is relatively poor. These larger angles are commonly encountered when first drilling into a reservoir.

U.S. Pat. App. Pub. No. US 2007/0216416 A1 to Itskovich, having the same assignee as the present invention and the contents of which are incorporated herein by reference, discloses an apparatus for evaluating an earth formation. The apparatus includes a downhole assembly conveyed in a borehole in the earth formation. The downhole assembly may include a member having a finite, non-zero conductivity. A transmitter associated with the downhole assembly produces a first transient electromagnetic signal in the earth formation. A receiver receives a second transient electromagnetic signal resulting from interaction of the first transient electromagnetic signal with the earth formation, the receiver being spaced apart from the transmitter. An electromagnetic shield associated with the downhole assembly reduces an effect on the second transient electromagnetic signal of substantially direct coupling between the transmitter and the receiver. A magnetostatic shield associated with the downhole assembly reduces an effect on the second transient electromagnetic signal of currents induced in the downhole assembly by the first transient electromagnetic signal. The electromagnetic shield may comprise a highly conductive material.

There is a need to design an induction system suitable for both geo-steering and measurements ahead of the drill bit. The system should be capable of looking up to five (5) meters ahead of the drill bit and up to ten (10) meters deep for the task of geo-steering. These requirements imply that, in the case of a vertical well, the system should be capable of seeing the approaching resistivity bed boundary up to five (5) meters in advance before the drill bit crosses the boundary. Similarly, in the case of geo-steering in a horizontal well, the system should be capable to see the approaching resistivity water-oil boundary located up to ten (10) meters way from the well. The present disclosure describes how to fulfill that need.

SUMMARY OF THE INVENTION

In a first set of examples of the present invention, a method is disclosed for estimating a formation property, the method including: generating an alternating electromagnetic field into the formation using a shielded transmitter; receiving a first signal using at least one shielded receiver; receiving a second signal using the at least one shielded receiver; and combining the first signal and the second signal to form at least in part a combined signal indicative of the formation property, where the combined signal includes attenuated downhole assembly parasitic effects.

In a further example, the first signal and the second signal are combined at least in part using a bucking estimation. In a further example, the bucking estimation includes at least one of the formulae:

$$\frac{M_1}{M_2} = \frac{r_1^3}{r_2^3} \text{ and } \Delta\varphi = \frac{\text{Re}(S_2)}{\text{Im}(S_2)} - \frac{\text{Re}(S_1)}{\text{Im}(S_1)}.$$

In another example, the first signal and the second signal are combined at least in part by constraining a difference of the received first signal and second signal. In a further example, the difference is constrained to zero.

In another example, the first signal and the second signal are combined at least in part using a phase difference between the received first signal and the received second signal.

In another example, generating an alternating electromagnetic field includes inducing a current.

In another example, the first signal is received at a first distance from the transmitter and the second signal is received at a second distance from the transmitter, the second distance being different from the first distance.

In another example, shielding the transmitter and receivers is accomplished using a conductive shield that is at least two and one-half times as long as the longest distance between the transmitter and either receiver.

In another example, the method further includes performing an inversion operation on the combined signals.

In another set of examples of the present invention, an apparatus for estimating a formation property is disclosed, the apparatus including: a transmitter capable of transmission of alternating currents; at least one receiver disposed at a distance from the transmitter; and an electrically conductive shield disposed between the transmitter and the at least one receiver, where the at least one receiver is configured to provide a first signal and a second signal, the first signal and the second signal when combined form at least in part a combined signal indicative of the formation property, the combined signal having an attenuated downhole assembly parasitic effect.

In a further example, the at least one receiver includes a first receiver and a second receiver. In a further example, the receivers are arranged and positioned such that a total signal received by the receivers is substantially equal to zero in the absence of formation. In a further example, the shield is at least two and one-half times as long as the longest distance between the transmitter and either receiver.

In a another example, the shield is longer than the distance between the transmitter and the at least one receiver.

In a another example, the electrically conductive shield further includes one or both of a magnetic portion and a copper portion.

In a another example, the transmitter includes at least one transmitter coil with a moment having a direction along an axis between the transmitter and the at least one receiver; and the at least one receiver having a receiving coil oriented in a direction non-parallel to the moment direction.

In a another example, the transmitter includes at least one transmitter coil with a moment having a direction along an axis between the transmitter and the at least one receiver; and the at least one receiver having a receiving coil oriented in a direction along the moment direction.

In a another example, the transmitter includes at least one transmitter coil with a moment having a direction non-parallel to an axis between the transmitter and the at least one receiver; and the at least one receiver having a receiving coil oriented in a direction along the axis between the transmitter and the at least one receiver.

In a another example, the electrically conductive shield has a thickness greater than a skin depth associated with a frequency of a transmitted alternating current. In a further example, the electrically conductive shield has a thickness greater than about 0.5 mm.

In a another set of examples of the present invention, an apparatus is disclosed for performing deep MWD measurements in the evaluation of an earth formation capable of both taking measurements ahead of the drill bit and taking measurements for geo-steering, the apparatus including: an electrical transmitter loop capable of transmission of alternating currents, disposed on a pipe; a two-coil bucking receiving system disposed on the pipe at a distance from the transmitter loop; a conductive copper shield wrapped around the pipe along the distance between the transmitter loop and the receiving system; and where the transmitter loop and receiving system, in combination, is centered along the length of the copper shield.

In a further example, the copper shield is between one and one-half (1.5) and two (2) times longer than the distance between the transmitter loop and the receiving system.

In a further example, the transmitter loop and the receiving system is a three coil induction system, where one coil of the three coil system operates as the transmitter loop and the other two coils operate as receivers of the receiving system.

In a further example, the receiver moments are selected in such way that the total signal measured by the receivers is equal to zero in the absence of formation.

In a further example, the apparatus further includes a non nonconductive magnetic ferrite disposed on the pipe, in combination with the electromagnetic copper shield.

In a further example, the apparatus further includes a magnetic and copper shield in combination with a three-coil bucking arrangement.

In a further example, the transmitter loop includes at least one transmitter coil with the moment Mz parallel to the pipe; and the receiving system includes at least two receiving coils oriented in the Z direction.

In a further example, the copper shield has a thickness greater than the skin depth for the frequency of the alternating currents.

In a further example, the copper shield has a thickness greater than 0.5 mm.

In a further example, the distance between the transmitter loop and the receiving system is between one (1) meter and ten (10) meters.

In a further example, the transmitter loop has at least one transmitter coil with the moment Mz parallel to the pipe and the receiving system has at least two receiving coils oriented in the X-direction.

In a further example, the transmitter loop has at least one transmitter coil with the moment Mx perpendicular to the pipe and at least two receiving coils of the receiving system are oriented in the X-direction.

In a further example, the transmitter loop has at least one transmitter coil with the moment Mx perpendicular to the pipe and at least two receiving coils of the receiving system are oriented in the Z-direction.

In another set of examples of the present invention, a method is disclosed for performing deep MWD measurements in the evaluation of an earth formation capable of both taking measurements ahead of a drill bit and taking measurements for geo-steering, the method including the steps of: deploying into the earth formation at least one transmitting coil and at least two receiving coils each spaced a part from the transmitter coil; covering with copper shield a space occupied by the transmitting and receiving coils; applying alternating current into the earth formation through the transmitting coil, whereby eddy currents are induced in the earth formation; and receiving signals resulting from the induced eddy currents in at least two of the receivers.

In a further example, the method includes the step of combining the received signals from two of the at least two coils, whereby a differential signal is derived that is substantially unaffected by the conductive body of a drill.

In a further example, the method includes the step of combining two responses measured by two coils placed at the different distances from the transmitting coil, whereby an additional increase of resolution or depth of investigation is achieved.

In a further example, the step of combining received signals includes the steps of: equating the ratio of the magnetic moments to the ratio of the cubes of the respective distances of the receiving coils from the transmitting coil; and constraining the difference of the measured signals to zero.

In a further example, the step of combining received signals includes the step of: measuring the phase difference between the received signals.

In a further example, the copper shield is covered to a distance at least twice the spaced a part distance of the transmitting coil and the at least two receiving coils.

In a further example, the method includes the step of performing an inversion operation on the combined received signals, whereby geo-electrical parameters of the earth formation are derived.

In a further example, the method includes the steps of: generating a model signal response using a model having no conductive pipe; and estimating an inversion modeling response.

In one example of the present invention, a computer-readable medium for use with an apparatus for evaluating an earth formation is disclosed, the apparatus for evaluating an earth formation including: an electrical transmitter loop capable of transmission of alternating currents, disposed on a pipe; a bucking receiving system disposed on the pipe at a distance from the transmitter loop, the receiving system having at least two coils; and a conductive copper shield wrapped around the pipe at a length at least twice the distance between the transmitter loop and the receiving system, the computer-readable medium including: instructions for combining the received signals from two of the at least two coils, whereby a differential signal is derived that is substantially unaffected by the conductive body of a drill.

In a further example, the computer-readable medium includes instructions for combining two responses measured by two coils placed at the different distances from the transmitting coil, whereby an additional increase of resolution or depth of investigation is achieved.

In a further example, the computer-readable medium includes instructions for equating the ratio of the magnetic moments to the ratio of the cubes of the respective distances of the receiving coils from the transmitting coil; and constraining the difference of the measured signals to zero.

In a further example, the computer-readable medium includes instructions for measuring the phase difference between the received signals.

In a further example, the computer-readable medium includes instructions for performing an inversion operation on the combined received signals, whereby geo-electrical parameters of the earth formation are derived.

In a further example, the computer-readable medium includes instructions for generating a model signal response using a model having no conductive pipe; and estimating an inversion modeling response.

BRIEF DESCRIPTION OF THE DRAWINGS

The present invention is best understood with reference to the attached drawings in which like numerals refer to like elements, and in which.

DETAILED DESCRIPTION OF THE INVENTION

Figure 1:
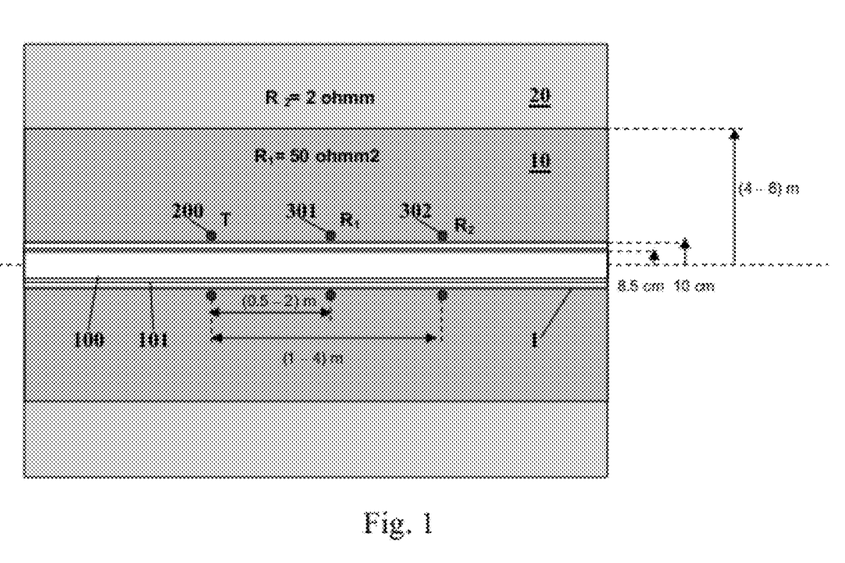
FIG. 1 illustrates a schematic diagram of an apparatus for performing ahead of the bit measurements in a horizontal well.

FIG. 1 illustrates a schematic diagram of an apparatus for performing ahead of the bit measurements in a horizontal well. Horizontal well 1 is disposed as a bore in layer 10 of an earth formation. Layer 20 is disposed over layer 10, away from well 1. In one example, Layer 20 is between 4 meters and 8 meters away from well 1. In one example, the resistivities of the layers are $\rho_1$=50 ohm-m for layer 10 and $\rho_2$=2 ohm-m for layer 20. A transmitter 200 is disposed in well 1. In one example, transmitter 200 is an electrical transmitter loop capable of transmission of alternating currents. Transmitter 200, in further example, is disposed on a pipe 100, representing the drill pipe or sub-assembly. In one example, pipe 100 has a radius of 8.5 cm. In one example, transmitter 200 has a coil radius of 10 cm. In one example, transmitter 200 is disposed in layer 10. A receiver 301 is disposed in well 1, placed at a distance from transmitter 200. In one example, receiver 301 is one coil of a two-coil bucking receiving system. Receiver 301, in further example, is disposed on pipe 100 at a distance from transmitter 200. In further example, receiver 301 is placed a distance of between 0.5 meter and 2.0 meters from transmitter 200. A second receiver 302 is disposed in well 1, placed at a distance from transmitter 200. In one example, receiver 302 is one coil of a two-coil bucking receiving system. Receiver 301, in further example, is disposed on the pipe 100 at a distance from transmitter 200. In further example, receiver 302 is placed a distance of between 1.0 meter and 4.0 meters from transmitter 200. In a further example, receiver 302 is placed a twice the distance from transmitter 200 as receiver 301 is placed from transmitter 200. In one example, receivers 301, 302 have a coil radius of 10 cm. In one example, receivers 301, 302 are disposed in layer 10. In a further example; a conductive copper shield 101 is wrapped around pipe 100 at a length at least twice the distance between the transmitter 100 and receiver 302, at a length at least twice the distance between the transmitter loop and the receiving system. In a further example, transmitter 200 and receivers 301, 302, in combination, is centered along the length of copper shield 101; e.g., where the transmitter loop and receiving system, in combination, is centered along the length of the copper shield.

Modeling results are used to illustrate the effectiveness of the approach described in various illustrative examples of the present invention. For these illustrative examples, the model uses a configuration as shown in FIG. 1, using the following physical parameters:
pipe radius=8.5 cm
resistivity of steel=0.714 E-06 ohmm
resistivity of copper=1.7 E-08 ohmm
radius of transmitter coil=10 cm
radius of receiver coil(s)=10 cm
resistivity of the resistive half-space $\rho_1$=50 ohmm (Ro1)
resistivity of the conductive half-space $\rho_2$=2 ohmm (Ro2).

Figure 2:
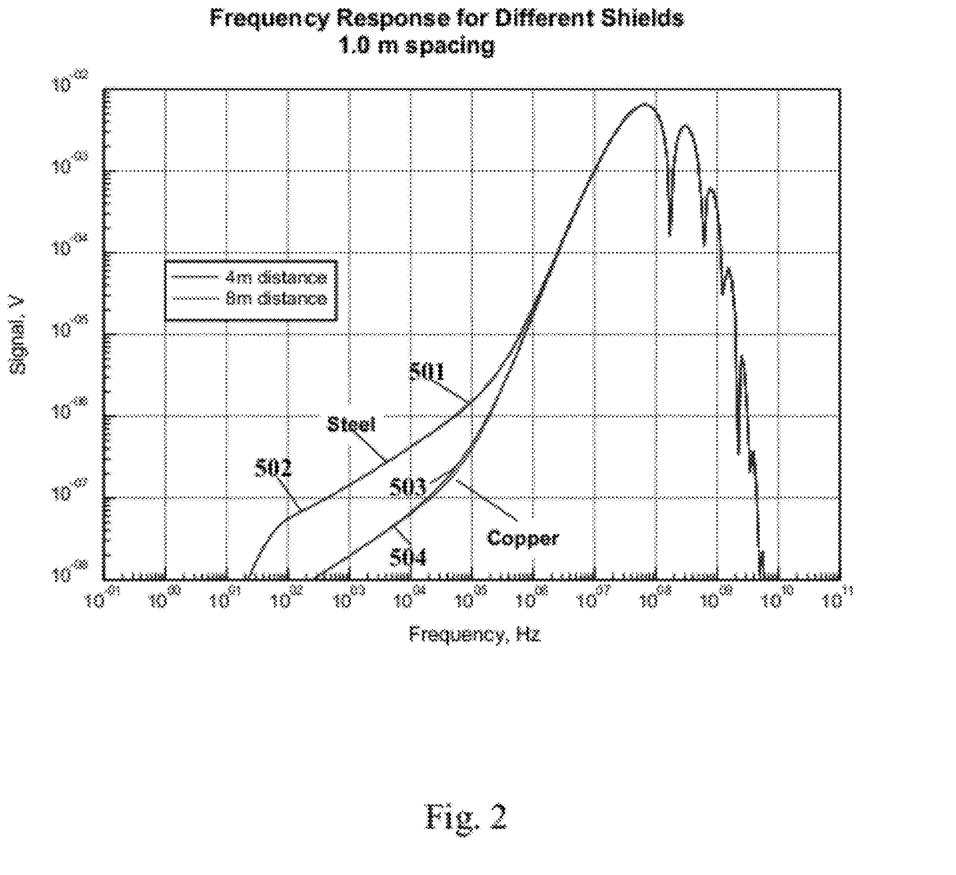
FIG. 2 illustrates a graph of mathematical modeling results representing the effectiveness of copper shield and steel (no shield) for a two coil arrangement having a spacing of one meter.

FIG. 2 illustrates a graph of mathematical modeling results representing the effectiveness of copper shield and steel (no shield) for a two coil arrangement having a spacing of one meter. In this example, there is no bucking coil and the results are without bucking compensation. An alternating current is applied into the earth formation through the transmitting coil, whereby eddy currents are induced in the earth formation, and the signals resulting from the induced eddy currents are received by the receiver. In this example, modeling is performed for two positions of a "water-oil" boundary: four (4) meters and eight (8) meters for the case of the steel pipe without shield and for the case when copper shield is added. The modeled response by the receiver is shown by curves 501, 502, 503, and 504. The x-axis of the graph represents frequency of the applied alternating current and the y-axis of the graph represents a measure of the received signal, in volts. Curve 501 illustrates the response of steel (no shield) with a distance to the conductive half-space being four (4) meters. Curve 502 illustrates the response of the steel (no shield) with a distance to the conductive half-space being eight (8) meters. Curve 503 illustrates the response to the copper shield with a distance to the conductive half-space being four (4) meters. Curve 504 illustrates the response to the copper shield with a distance to the conductive half-space being eight (8) meters. It is noted that the steel (no shield) responses for conductive half-space distances of either four (4) or eight (8) meters are nearly identical, especially at frequencies greater than one (1) MegaHertz. It is noted that the copper responses for conductive half-space distances of either four (4) or eight (8) meters are nearly identical, especially at frequencies greater than one (1) MegaHertz. It is noted that copper shield and steel (no shield) responses are nearly identical for frequencies greater than one (1) MegaHertz, with the greatest difference between steel and copper occurring at frequencies less than one (1) MegaHertz.

In modeling, the effect of the copper shield is simulated by using the conductivity of copper for the pipe when conducting the modeling calculations. This implies that copper shield is about two to three (2-3) times thicker than the skin depth of the copper, which is about 0.5 mm at frequency of 10 kHz.

Figure 3:
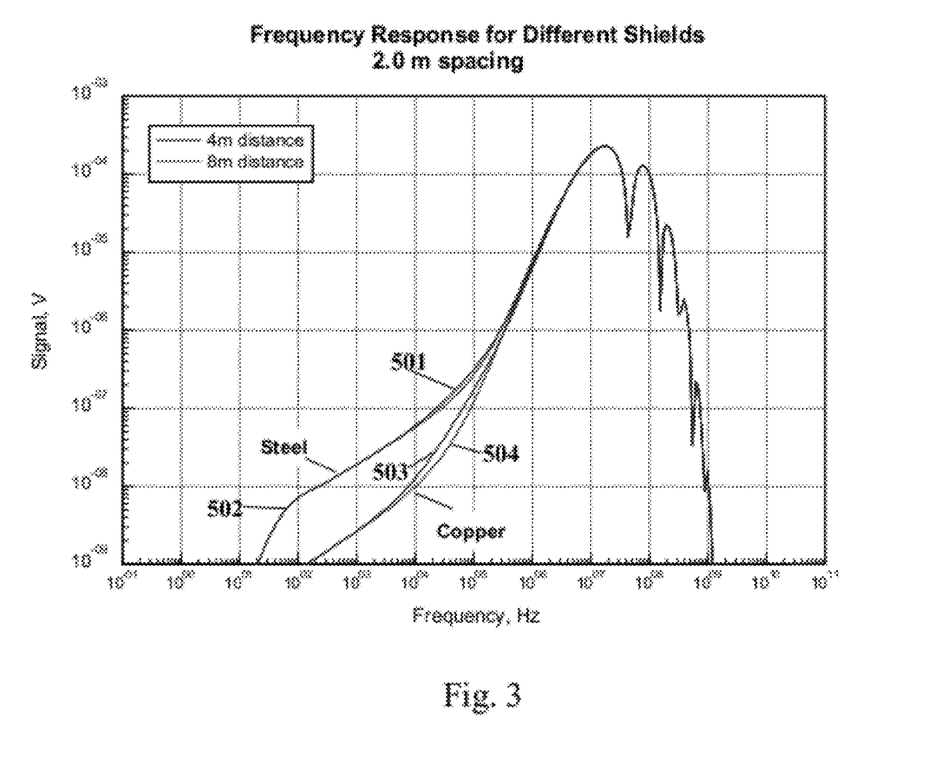
FIG. 3 illustrates a graph of mathematical modeling results representing the effectiveness of copper shield and steel (no shield) for a two coil arrangement having a spacing of two (2) meters.

FIG. 3 illustrates a graph of mathematical modeling results representing the effectiveness of copper shield and steel (no shield) for a two coil arrangement having a spacing of two (2) meters. As in FIG. 2, curves 501, 502, 503, and 504 illustrate their respective responses based on copper shielding or steel (no shielding) and distance to the conductive half-space, four (4) meters or eight (8) meters.

Figure 4:
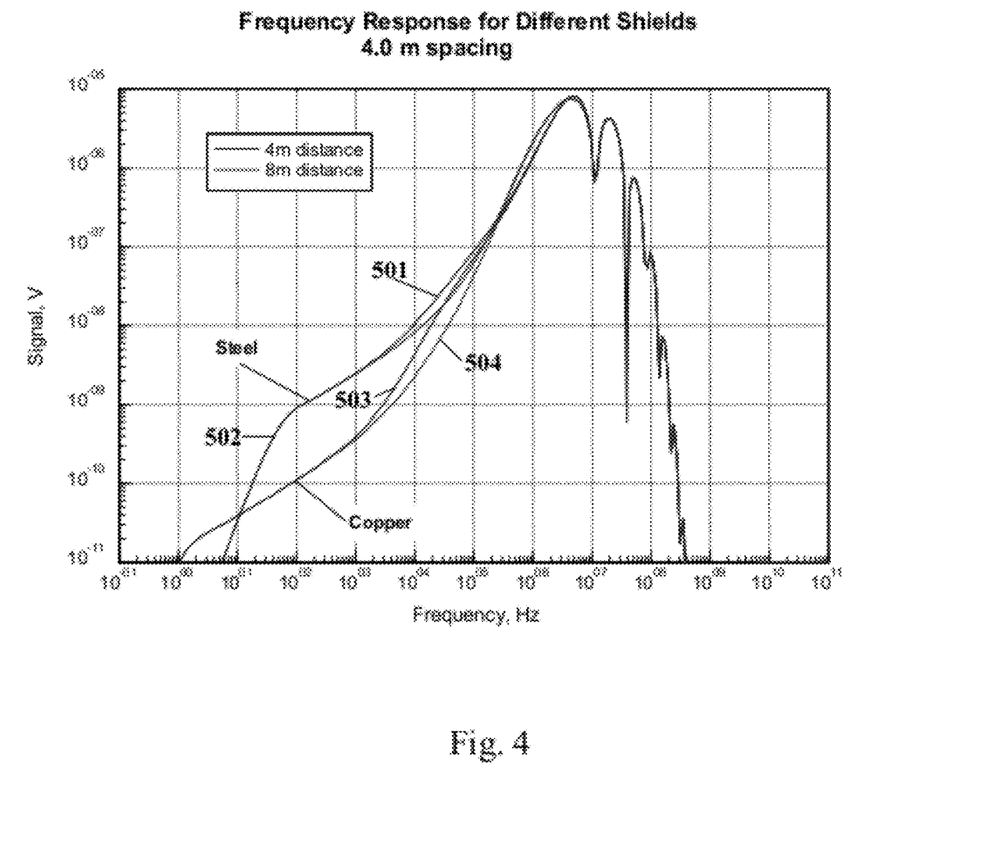
FIG. 4 illustrates a graph of mathematical modeling results representing the effectiveness of copper shield and steel (no shield) for a two coil arrangement having a spacing of four (4) meters.

FIG. 4 illustrates a graph of mathematical modeling results representing the effectiveness of copper shield and steel (no shield) for a two coil arrangement having a spacing of four (4) meters. As in FIG. 2, curves 501, 502, 503, and 504 illustrate their respective responses based on copper shielding or steel (no shielding) and distance to the conductive half-space, four (4) meters or eight (8) meters.

Looking at the frequency responses corresponding to the different positions of the water-oil boundary (that is, the distance to the conductive half-space) and the various spacings between the transmitter and the receiver, it is noted that the presence of the copper shield, versus steel (no shield), leads to a better separation between curves for all considered spacings of the transmitter-receiver pair: one (1) meter illustrated in FIG. 2, two (2) meters illustrated in FIG. 3, and four (4) meters illustrated in FIG. 4. Noticeably, there is a frequency range (about 1 MHz and above) where response for the model with copper shield is the same as the one corresponding to the model without shield. This indicates that, in this example, no copper shield is required in case of shallow objects, and the main advantage from using copper shield is possibility in resolving models with a relatively far-located boundary which can not be resolved with frequencies above 1 MHz.

Figure 5:
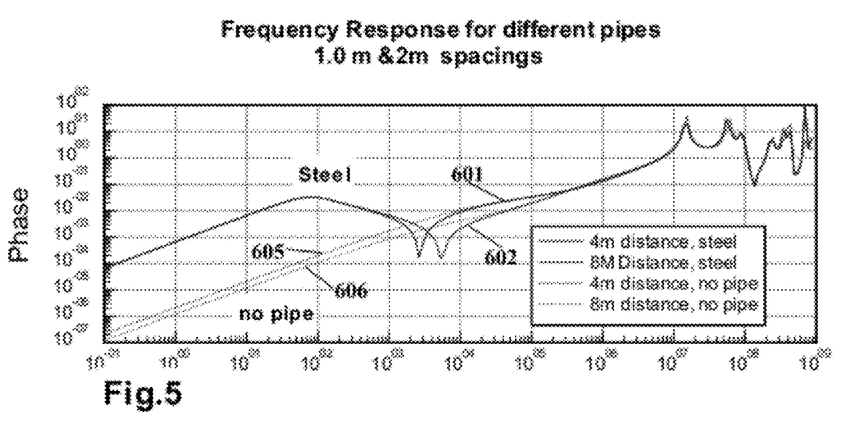
FIG. 5 illustrates a graph of mathematical modeling results representing the effectiveness of steel pipe (no shield) and no pipe for a three coil arrangement having a spacing of one meter for one receiver and two meters for a second receiver.

FIG. 5 illustrates a graph of mathematical modeling results representing the effectiveness of steel pipe (no shield) and no pipe for a three coil arrangement having a spacing of one meter for one receiver and two meters for a second receiver. The bucking response is synthesized measuring the phase difference according to the formula:

$$\Delta \varphi = \frac{Re(S_2)}{Im(S_2)} - \frac{Re(S_1)}{Im(S_1)},$$

where S1 is the signal measures by the first receiver and S2 is the signal measured by the second receiver. The modeled bucking response is shown by curves 601, 602, 605, and 606. The x-axis of the graph represents the frequency of the applied alternating current and the y-axis of the graph represents the phase difference of the received signals, according to the bucking response formula. Curve 601 illustrates the response of steel (no shield) with a distance to the conductive half-space being four (4) meters. Curve 602 illustrates the response of the steel (no shield) with a distance to the conductive half-space being eight (8) meters. Curve 605 illustrates the response to no pipe with a distance to the conductive half-space being four (4) meters. Curve 606 illustrates the response to no pipe with a distance to the conductive half-space being eight (8) meters.

Figure 6:
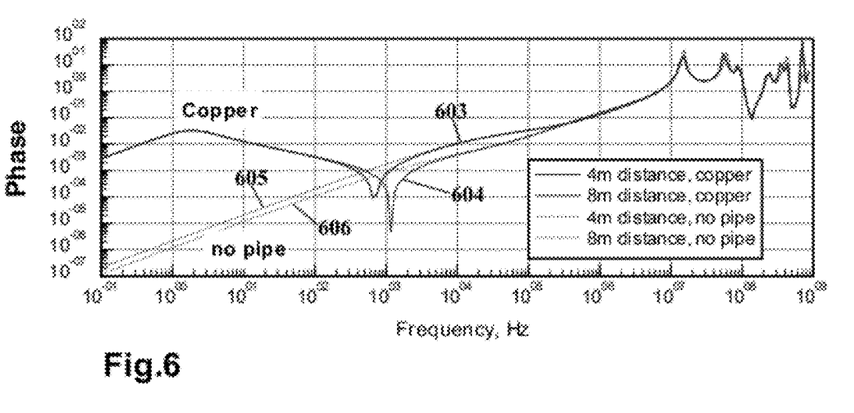
FIG. 6 illustrates a graph of mathematical modeling results representing the effectiveness of copper shield and no pipe for a three coil arrangement having a spacing of one meter for one receiver and two meters for the second receiver.

FIG. 6 illustrates a graph of mathematical modeling results representing the effectiveness of copper shield and no pipe for a three coil arrangement having a spacing of one meter for one receiver and two meters for the second receiver. The modeled bucking response is shown by curves 603, 604, 605, and 606. The x-axis of the graph represents the frequency of the applied alternating current and the y-axis of the graph represents the phase difference of the received signals, according to the bucking response formula. Curve 603 illustrates the response of copper shield with a distance to the conductive half-space being four (4) meters. Curve 604 illustrates the response of copper shield with a distance to the conductive half-space being eight (8) meters. Curve 605 illustrates the response to no pipe with a distance to the conductive half-space being four (4) meters. Curve 606 illustrates the response to no pipe with a distance to the conductive half-space being eight (8) meters.

A comparison of the curves from FIG. 5 and FIG. 6 shows that use of the copper shield extends, by a factor of seven (7), the frequency range for which frequency responses for the models with pipe is the same as the responses for the models with no pipe. In this frequency range, one dimensional modeling of the frequency responses (for models with no pipe) can be used for interpretation of the two-dimensional responses (for models with pipe and with shield). This is an important practical fact, since one-dimensional modeling of the responses is much simpler to perform compared to two dimensional modeling.

Figure 7:
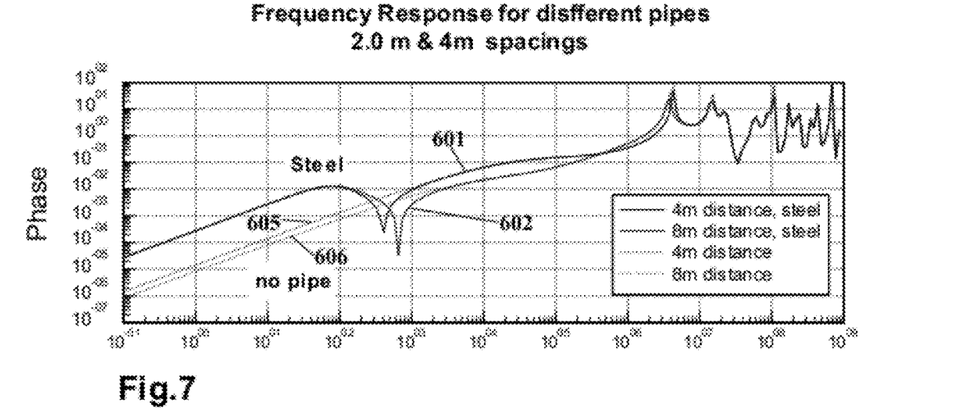
FIG. 7 illustrates a graph of mathematical modeling results representing the effectiveness of steel pipe (no shield) and no pipe for a three coil arrangement having a spacing of two meters for one receiver and four meters for a second receiver.

FIG. 7 illustrates a graph of mathematical modeling results representing the effectiveness of steel pipe (no shield) and no pipe for a three coil arrangement having a spacing of two meters for one receiver and four meters for a second receiver. The bucking response is synthesized measuring the phase difference according to the formula, as previously mentioned herein. The modeled bucking response is shown by curves 601, 602, 605, and 606. The x-axis of the graph represents the frequency of the applied alternating current and the y-axis of the graph represents the phase difference of the received signals, according to the bucking response formula. Curve 601 illustrates the response of steel (no shield) with a distance to the conductive half-space being four (4) meters. Curve 602 illustrates the response of the steel (no shield) with a distance to the conductive half-space being eight (8) meters. Curve 605 illustrates the response to no pipe with a distance to the conductive half-space being four (4) meters. Curve 606 illustrates the response to no pipe with a distance to the conductive half-space being eight (8) meters.

Figure 8:
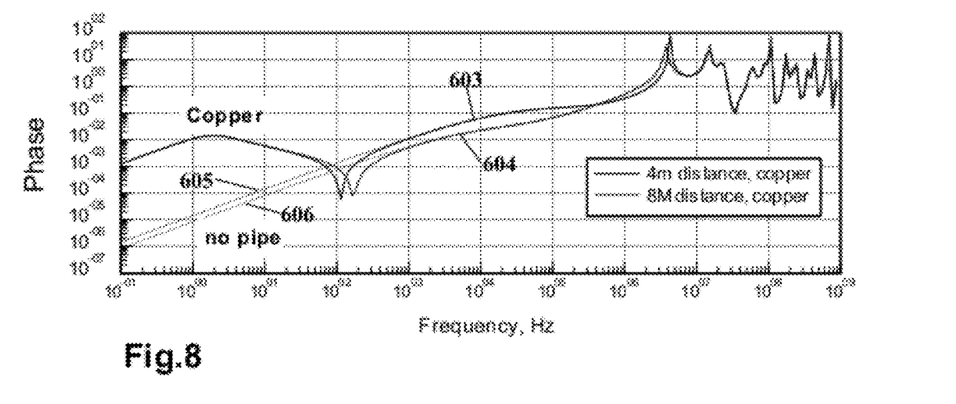
FIG. 8 illustrates a graph of mathematical modeling results representing the effectiveness of copper shield and no pipe for a three coil arrangement having a spacing of two meters for one receiver and four meters for a second receiver.

FIG. 8 illustrates a graph of mathematical modeling results representing the effectiveness of copper shield and no pipe for a three coil arrangement having a spacing of two meters for one receiver and four meters for a second receiver. The modeled bucking response is shown by curves 603, 604, 605, and 606. The x-axis of the graph represents the frequency of the applied alternating current and the y-axis of the graph represents the phase difference of the received signals, according to the bucking response formula. Curve 603 illustrates the response of copper shield with a distance to the conductive half-space being four (4) meters. Curve 604 illustrates the response of copper shield with a distance to the conductive half-space being eight (8) meters. Curve 605 illustrates the response to no pipe with a distance to the conductive half-space being four (4) meters. Curve 606 illustrates the response to no pipe with a distance to the conductive half-space being eight (8) meters.

Figure 9:
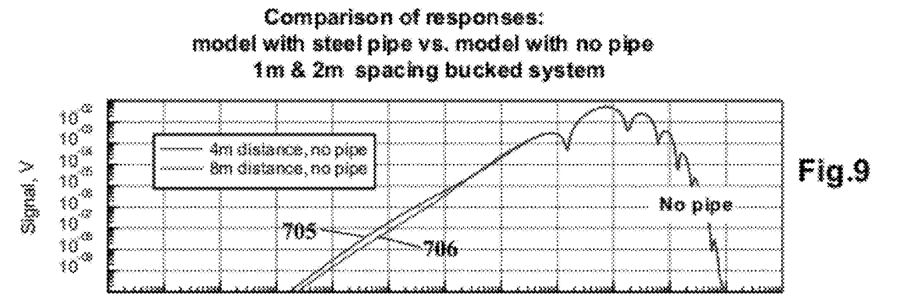
FIG. 9 illustrates a graph of mathematical modeling results representing the signal response in the absence of pipe (no pipe) for a three coil arrangement having a spacing of one meter for one receiver and two meters for a second receiver.

FIG. 9 illustrates a graph of mathematical modeling results representing the signal response in the absence of pipe (no pipe) for a three coil arrangement having a spacing of one meter for one receiver and two meters for a second receiver. The bucking response is synthesized by generating the signal response while restraining the following conditions according to the formula:

$$\frac{M_1}{M_2} = \frac{r_1^3}{r_2^3},$$

where M1 is the magnetic moment of the first receiver and is placed at the distance r1 from the transmitter, and the M2 is the magnetic moment of the second receiver and is placed at the distance r2 from the transmitter. The equation is known in the induction measurements as the "bucking condition" of the primary signal. By subtracting signal S2 measured at distance r2 (from the transmitter) from the signal S1 measured at distance r1 (from the transmitter) we assure that in the absence of both conductive pipe and formation the differential response is equal to zero, per formula:

$$\Delta S = S_2 - S_1 = 0,$$

where S1 is the signal measured by the first receiver and S2 is the signal measured by the second receiver. The modeled bucking response is shown by curves 705 and 706. The x-axis of the graph represents frequency of the applied alternating current and the y-axis of the graph represents a measure of the differential signal, in volts, according to the bucking response formulae. Curve 705 illustrates the response in the absence of pipe (no pipe) with a distance to the conductive half-space being four (4) meters. Curve 706 illustrates the response in the absence of pipe (no pipe) with a distance to the conductive half-space being eight (8) meters.

Figure 10:
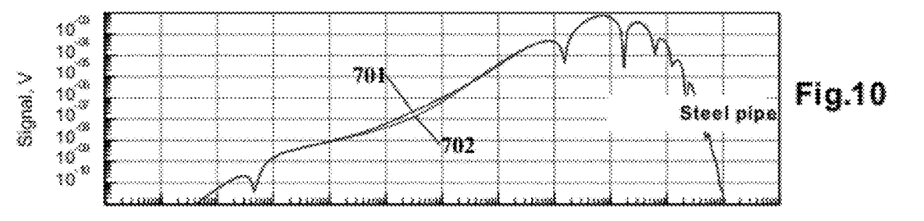
FIG. 10 illustrates a graph of mathematical modeling results representing the signal response in the presence of steel pipe for a three coil arrangement having a spacing of one meter for one receiver and two meters for a second receiver.

FIG. 10 illustrates a graph of mathematical modeling results representing the signal response in the presence of steel pipe for a three coil arrangement having a spacing of one meter for one receiver and two meters for a second receiver. The bucking response is synthesized by generating the differential signal response while restraining magnetic moment and distance conditions according to the bucking response formulae. The modeled bucking response is shown by curves 701 and 702. The x-axis of the graph represents frequency of the applied alternating current and the y-axis of the graph represents a measure of the differential signal, in volts, according to the bucking response formulae. Curve 701 illustrates the response of steel (no shield) with a distance to the conductive half-space being four (4) meters. Curve 702 illustrates the response of the steel (no shield) with a distance to the conductive half-space being eight (8) meters. FIG. 10 represents a combination of the results derived in FIG. 2 and FIG. 3 for response of steel (no shield), curves 501 and 502.

Figure 11:
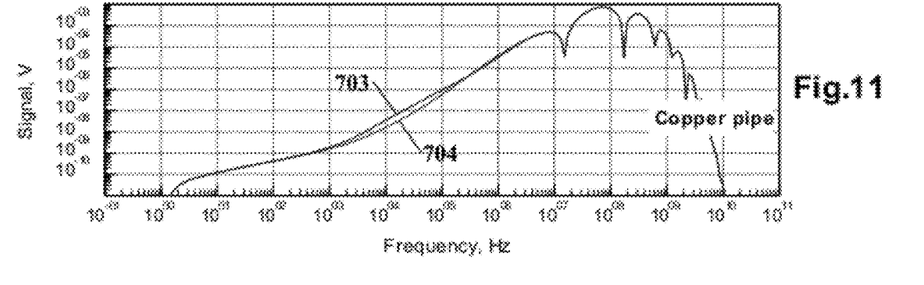
FIG. 11 illustrates a graph of mathematical modeling results representing the signal response in the presence of copper shield for a three coil arrangement having a spacing of one meter for one receiver and two meters for a second receiver.

FIG. 11 illustrates a graph of mathematical modeling results representing the signal response in the presence of copper shield for a three coil arrangement having a spacing of one meter for one receiver and two meters for a second receiver. The bucking response is synthesized by generating the differential signal response while restraining magnetic moment and distance conditions according to the bucking response formulae. The modeled bucking response is shown by curves 703 and 704. The x-axis of the graph represents frequency of the applied alternating current and the y-axis of the graph represents a measure of the differential signal, in volts, according to the bucking response formulae. Curve 703 illustrates the response in the presence of copper shield with a distance to the conductive half-space being four (4) meters. Curve 704 illustrates the response in the presence of copper shield with a distance to the conductive half-space being eight (8) meters. FIG. 11 represents a combination of the results derived in FIG. 2 and FIG. 3 for response in the presence of copper shield, curves 503 and 504.

Figure 12:
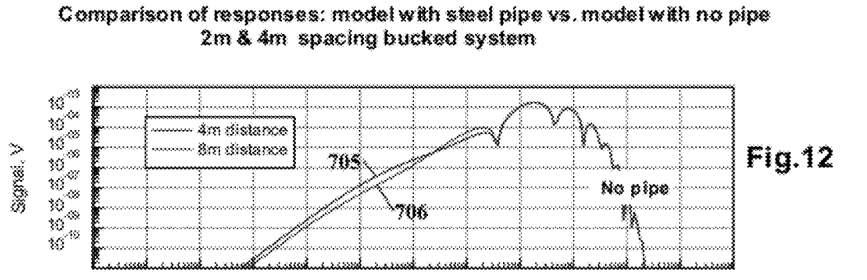
FIG. 12 illustrates a graph of mathematical modeling results representing the signal response in the absence of pipe (no pipe) for a three coil arrangement having a spacing of two meters for one receiver and four meters for a second receiver.

FIG. 12 illustrates a graph of mathematical modeling results representing the signal response in the absence of pipe (no pipe) for a three coil arrangement having a spacing of two meters for one receiver and four meters for a second receiver. The bucking response is synthesized by generating the differential signal response while restraining magnetic moment and distance conditions according to the bucking response formulae. The modeled bucking response is shown by curves 705 and 706. The x-axis of the graph represents frequency of the applied alternating current and the y-axis of the graph represents a measure of the differential signal, in volts, according to the bucking response formulae. Curve 705 illustrates the response in the absence of pipe (no pipe) with a distance to the conductive half-space being four (4) meters. Curve 706 illustrates the response in the absence of pipe (no pipe) with a distance to the conductive half-space being eight (8) meters.

Figure 13:
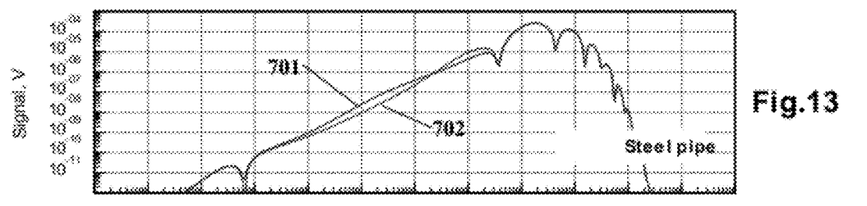
FIG. 13 illustrates a graph of mathematical modeling results representing the signal response in the presence of steel pipe for a three coil arrangement having a spacing of two meters for one receiver and four meters for a second receiver.

FIG. 13 illustrates a graph of mathematical modeling results representing the signal response in the presence of steel pipe for a three coil arrangement having a spacing of two meters for one receiver and four meters for a second receiver. The bucking response is synthesized by generating the differential signal response while restraining magnetic moment and distance conditions according to the bucking response formulae. The modeled bucking response is shown by curves 701 and 702. The x-axis of the graph represents frequency of the applied alternating current and the y-axis of the graph represents a measure of the differential signal, in volts, according to the bucking response formulae. Curve 701 illustrates the response of steel (no shield) with a distance to the conductive half-space being four (4) meters. Curve 702 illustrates the response of the steel (no shield) with a distance to the conductive half-space being eight (8) meters. FIG. 13 represents a combination of the results derived in FIG. 3 and FIG. 4 for response of steel (no shield), curves 501 and 502.

Figure 14:
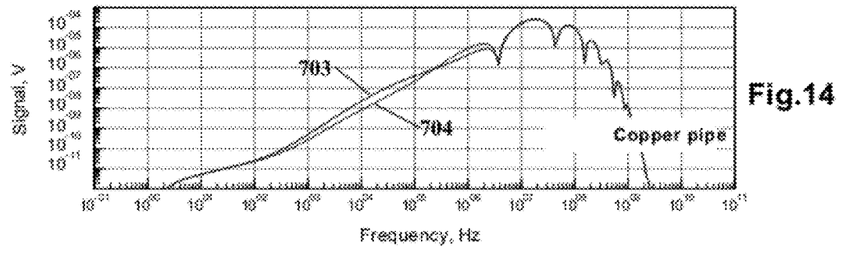
FIG. 14 illustrates a graph of mathematical modeling results representing the signal response in the presence of copper shield for a three coil arrangement having a spacing of two meters for one receiver and four meters for a second receiver.

FIG. 14 illustrates a graph of mathematical modeling results representing the signal response in the presence of copper shield for a three coil arrangement having a spacing of two meters for one receiver and four meters for a second receiver. The bucking response is synthesized by generating the differential signal response while restraining magnetic moment and distance conditions according to the bucking response formulae. The modeled bucking response is shown by curves 703 and 704. The x-axis of the graph represents frequency of the applied alternating current and the y-axis of the graph represents a measure of the differential signal, in volts, according to the bucking response formulae. Curve 703 illustrates the response in the presence of copper shield with a distance to the conductive half-space being four (4) meters. Curve 704 illustrates the response in the presence of copper shield with a distance to the conductive half-space being eight (8) meters. FIG. 14 represents a combination of the results derived in FIG. 3 and FIG. 4 for response in the presence of copper shield, curves 503 and 504.

The same degree of suppression of the pipe effect is demonstrated in the curves from FIG. 9 through FIG. 14 of bucking calculations synthesized by generating the differential signal response while restraining magnetic moment and distance conditions according to the bucking response formulae, as is with the curves from FIG. 5 through FIG. 8 of bucking calculations synthesized by measuring the phase difference of the signal demonstrates the same degree of suppression of the pipe effect.

Figure 15:
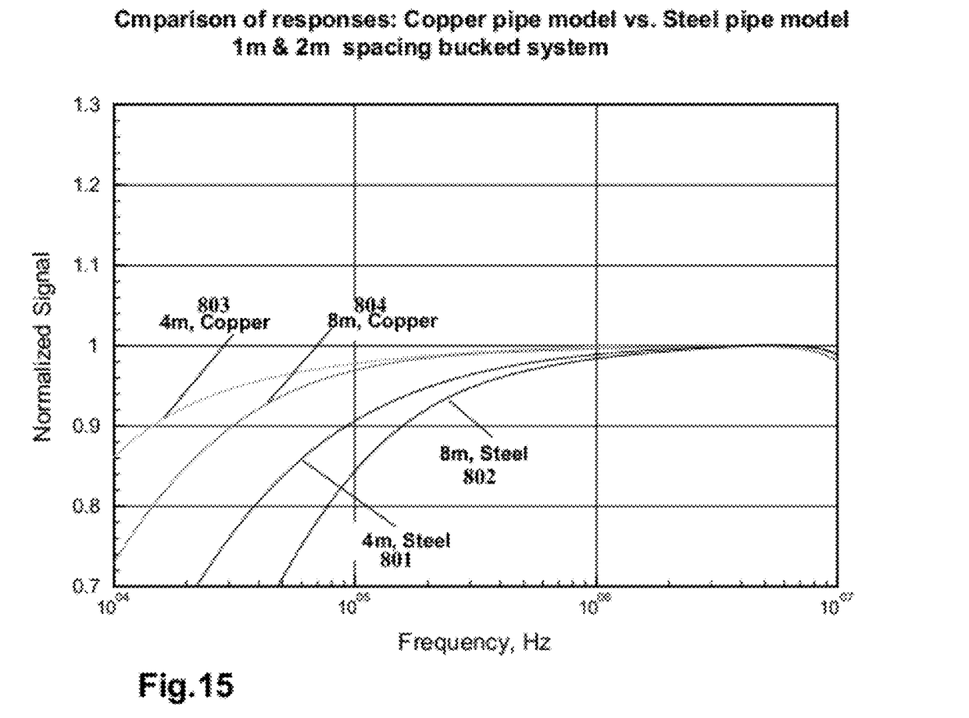
FIG. 15 illustrates a graph showing a normalized signal response comparing the effects of the copper shielding and steel pipe for a three coil arrangement having a spacing of one meter for one receiver and two meters for a second receiver.

FIG. 15 illustrates a graph showing a normalized signal response comparing the effects of the copper shielding and steel pipe for a three coil arrangement having a spacing of one meter for one receiver and two meters for a second receiver. The x-axis of the graph represents frequency of the applied alternating current and the y-axis of the graph represents a normalized value for the signal. The normalized signal responses are determined by dividing each system response by the response corresponding to the system that has no pipe. In this normalized notation a reading of one (1) would indicate an identity or equality of two responses. The normalized signal responses are shown by curves 801, 802, 803, and 804. Curve 801 illustrates the response to steel pipe (no shielding) with a distance to the conductive half-space being four (4) meters. Curve 802 illustrates the response to steel pipe (no shielding) with a distance to the conductive half-space being eight (8) meters. Curve 803 illustrates the response of copper shield with a distance to the conductive half-space being four (4) meters. Curve 804 illustrates the response of copper shield with a distance to the conductive half-space being eight (8) meters.

Figure 16:
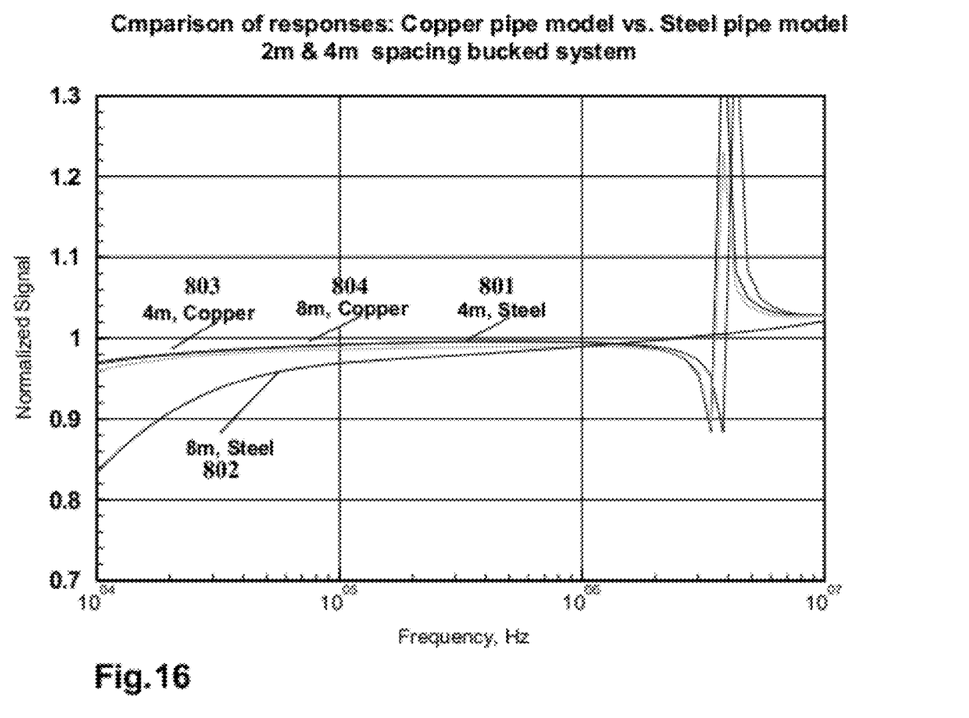
FIG. 16 illustrates a graph showing a normalized signal response comparing the effects of the copper shielding and steel pipe for a three coil arrangement having a spacing of two meters for one receiver and four meters for a second receiver.

FIG. 16 illustrates a graph showing a normalized signal response comparing the effects of the copper shielding and steel pipe for a three coil arrangement having a spacing of two meters for one receiver and four meters for a second receiver. The x-axis of the graph represents frequency of the applied alternating current and the y-axis of the graph represents a normalized value for the signal. The normalized signal responses are shown by curves 801, 802, 803, and 804. Curve 801 illustrates the response to steel pipe (no shielding) with a distance to the conductive half-space being four (4) meters. Curve 802 illustrates the response to steel pipe (no shielding) with a distance to the conductive half-space being eight (8) meters. Curve 803 illustrates the response of copper shield with a distance to the conductive half-space being four (4) meters. Curve 804 illustrates the response of copper shield with a distance to the conductive half-space being eight (8) meters.

Based on FIG. 15 and FIG. 16, a copper shield significantly increases the frequency range where the model with pipe closely matches the model with no pipe. Given a practical, tolerable deviation of ten percent (10%) between responses, then the short bucked system (one meter and two meter receiver spacing, per FIG. 15) demonstrates an increase of frequency range by about a factor of three (3). In such case, the frequency range where the normalized response exceeds reading of 0.9 (e.g., within 10% of the normalized value of unity) is greatly increased. For a long bucked system (two meter and four meter receiver spacing, per FIG. 16) the frequency range is increased by almost a factor of ten (10).

The method and apparatus of the present disclosure has been in terms of a bottomhole assembly conveyed on a drilling tubular. The method and apparatus may also be practiced using devices on a logging string conveyed on a wireline. Collectively, the bottom hole assembly and a wireline-conveyed logging string may be referred to as downhole assemblies.

In at least one example, the processing of the data is accomplished by a downhole processor. In at least one example, the processing of the data is accomplished by a surface processor. Implicit in the control and processing of the data is the use of a computer program implemented on a suitable machine-readable medium that enables the processor to perform the control and processing. The machine-readable medium may include ROMs, EPROMs, EAROMs, flash memories and/or optical disks.

The foregoing disclosure is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant in the art having the benefit of the present disclosure. Further, the embodiments described are also intended to explain the best mode for carrying out the invention, and to enable others skilled in the art to utilize the invention and such or other embodiments and with various modifications required by the particular applications or uses of the invention. It is intended that the claims based on this disclosure be construed to include alternative embodiments to the extent that is permitted by prior art.

The invention claimed is:

1. A method for estimating a formation property, the method comprising:
generating an alternating electromagnetic field into the formation using a shielded transmitter;
receiving a first signal using at least one shielded receiver;
receiving a second signal using the at least one shielded receiver;
combining the first signal and the second signal to form at least in part a combined signal indicative of the formation property, wherein the combined signal includes attenuated downhole assembly parasitic effects; and
wherein the transmitter and the at least one receiver are shielded from downhole assembly parasitic effects by a non-ferromagnetic electrically conductive shield disposed on a downhole assembly between the transmitter and the receivers.

2. The method of claim 1 wherein the first signal and second signal are combined at least in part using a bucking estimation.

3. The method of claim 2, wherein the bucking estimation includes at least one of the formulae:

$$\frac{M_1}{M_2} = \frac{r_1^3}{r_2^3} \text{ and } \Delta\varphi = \frac{\text{Re}(S_2)}{\text{Im}(S_2)} - \frac{\text{Re}(S_1)}{\text{Im}(S_1)};$$

where
M1 is a magnetic moment of a first receiver,
r1 is a distance of the first receiver from the transmitter,
M2 is a magnetic moment of a second receiver,
r2 is a distance of the second receiver from the transmitter,
$\Delta\varphi$ is a bucking response,
Re($S_2$) is a real component of the second signal,
Im($S_2$) is a imaginary component of the second signal,
Re($S_1$) is a real component of the first signal, and
Im($S_1$) is an imaginary component of the first signal.

4. The method of claim 2 wherein the first signal and the second signal are combined at least in part by constraining a difference of the received first signal and second signal.

5. The method of claim 4 wherein the difference is constrained to zero.

6. The method of claim 1, wherein the first signal and the second signal are combined at least in part using a phase difference between the received first signal and the received second signal.

7. The method of claim 1 wherein generating an alternating electromagnetic field includes inducing a current.

8. The method of claim 1 wherein the first signal is received at a first distance from the transmitter and the second signal is received at a second distance from the transmitter, the second distance being different from the first distance.

9. The method of claim 1 wherein the non-ferromagetic conductive shield is at least two and one-half times as long as the longest distance between the transmitter and either receiver.

10. The method of claim 1 wherein the electrically conductive shield is copper.

11. The method of claim 10 wherein the copper shield is wrapped around the assembly at a length at least twice the distance between the transmitter and the at least one receiver.

12. An apparatus for estimating a formation property, the apparatus comprising:
a transmitter capable of transmission of alternating currents;
at least one receiver disposed at a distance from the transmitter;
a non-ferromagnetic electrically conductive shield disposed on a downhole assembly between the transmitter and the at least one receiver,
wherein the at least one receiver is configured to provide a first signal and a second signal, the first signal and the second signal when combined form at least in part a combined signal indicative of the formation property, the combined signal having attenuated downhole assembly parasitic effects; and
wherein the conductive shield is positioned and arranged to electrically shield the transmitter and the at least one receiver from downhole assembly parasitic effects.

13. The apparatus of claim 12, wherein the at least one receiver includes a first receiver and a second receiver.

14. The apparatus of claim 13, wherein the receivers are arranged and positioned such that a total signal received by the receivers is substantially equal to zero in the absence of formation.

15. The apparatus of claim 13, wherein the shield is at least two and one-half times as long as the longest distance between the transmitter and either receiver.

16. The apparatus of claim 12, wherein the shield is longer than the distance between the transmitter and the at least one receiver.

17. The apparatus of claim 12, wherein the transmitter comprises at least one transmitter coil with a moment having a direction along an axis between the transmitter and the at least one receiver; and the at least one receiver having a receiving coil oriented in a direction non-parallel to the moment direction.

18. The apparatus of claim 12, wherein the transmitter comprises at least one transmitter coil with a moment having a direction along an axis between the transmitter and the at least one receiver; and the at least one receiver having a receiving coil oriented in a direction along the moment direction.

19. The apparatus of claim 12, wherein the transmitter comprises at least one transmitter coil with a moment having a direction non-parallel to an axis between the transmitter and the at least one receiver; and the at least one receiver having a receiving coil oriented in a direction along the axis between the transmitter and the at least one receiver.

20. The apparatus of claim 12, wherein the electrically conductive shield has a thickness greater than a skin depth associated with a frequency of a transmitted alternating current.

21. The apparatus of claim 12 wherein the electrically conductive shield is copper.

22. The apparatus of claim 21 wherein the copper shield is wrapped around the assembly at a length at least twice the distance between the transmitter and the at least one receiver.

* * * * *